United States Patent [19]

Batjukov et al.

[11] 4,236,967
[45] Dec. 2, 1980

[54] GRIPPING MEANS FOR FUEL ASSEMBLIES OF NUCLEAR REACTOR

[76] Inventors: Vladimir I. Batjukov, ulitsa Prygunova, 9, kv. 29; Oleg N. Vjugov, ulitsa Novaya, 24, kv. 2; Alexandr I. Fadeev, ulitsa Engelsa, 21, kv. 46; Tsolak G. Shkhian, naberezhnaya Zhdanova, 6, kv. 16, all of Gorky, U.S.S.R.

[21] Appl. No.: 866,711

[22] Filed: Jan. 3, 1978

[51] Int. Cl.² ............... G21C 19/20; B66C 17/08; B66C 1/10
[52] U.S. Cl. ................ 176/30; 294/86 A; 414/146
[58] Field of Search ............... 176/30, 31, 32; 294/86 A; 214/18 N; 414/146

[56] References Cited

FOREIGN PATENT DOCUMENTS

| 732079 | 4/1966 | Canada | 294/86 A |
| 1247588 | 8/1967 | Fed. Rep. of Germany | 294/86 A |
| 1334480 | 7/1962 | France | 294/86 A |
| 1360066 | 5/1963 | France | 294/86 A |

Primary Examiner—Samuel W. Engle
Assistant Examiner—Donald P. Walsh
Attorney, Agent, or Firm—Fleit & Jacobson

[57] ABSTRACT

The proposed gripping means for fuel assemblies of a nuclear reactor comprises a housing, whereupon there is movably mounted a slider provided with longitudinally extending slots to receive gripping jaws whose tails are pivotably secured to the housing of the gripping means. On one side, the end faces of the longitudinally extending slots are slanted with respect to the longitudinal axis of the gripping means and come in contact with the teeth of the gripping jaws provided on the end which is opposite to the tail, whereby the jaws open as the slider and housing of the gripping means moves relative to each other so that the teeth are received in an internal groove provided in the head of the fuel assembly.

1 Claim, 3 Drawing Figures

GRIPPING MEANS FOR FUEL ASSEMBLIES OF NUCLEAR REACTOR

The present invention relates to nuclear reactor refuelling machines and, more particularly, to gripping means for fuel assemblies of nuclear reactors.

The invention can be used to advantage in refuelling equipment of nuclear reactors whose fuel assemblies have heads provided with an internal groove to receive the gripping jaws of the gripping means of the refuelling machine.

There is known a gripping means for fuel assemblies of a nuclear reactor, comprising a housing accomodating a slider which is movable with respect to the housing and comes into contact with gripping jaws. On one side, the ends of the gripping jaws are pivotably mounted on the housing. On the opposite side, they are provided with teeth received in an internal groove provided in the head of a fuel assembly as the gripping jaws open as a result of mutual motion of the slider and housing (cf. French Pat. No. 1,334,480, Cl. G 05g - G 21).

In the gripping means of the above references, the gripping jaws are arranged so that their teeth extend outside the housing and slider of the gripping means. The gripping jaws come into contact with the internal surface of the slider, provided with projections and recesses. As the slider moves with respect to the housing of the gripping means, the gripping jaws interact with the projections and recesses of the slider and rotate about the axle by means of which they are pivotably mounted on the housing. Due to this rotation, the teeth of the gripping jaws are received in or withdrawn from the internal groove of the fuel assembly. Thus the gripping means grips or releases the fuel assembly.

Due to the fact that the teeth of the gripping jaws extend outside the slider and housing of the gripping means, the teeth can run into or strike at the head of the fuel assembly being handled or one of the adjacent fuel assemblies as said teeth are introduced into the internal groove of the head of the fuel assembly to be handled or as the gripping means is oriented with respect to the fuel assembly's head. The impact can bend or damage the gripping jaws, whereby the gripping means may be rendered inoperative.

As fuel assemblies are being handled, the force at which a fuel assemby is withdrawn from its socket and the weight of the fuel assembly are transmitted to the drive of the refuelling machine through the gripping jaws. The force is transmitted from the teeth of the gripping jaws to the axles whereupon said gripping jaws are mounted and to the slider at a point where the gripping jaws are in contact with the slider. This means that the whole body of each gripping jaw is involved in the force transmission process. The transmission of forces through the entire body of the gripping jaw and the axle whereupon it is mounted can also damage the jaw or its axle, whereby the gripping means is put out of action.

It is an object of the present invention to improve the operating reliability of the gripping means for fuel assemblies of a nuclear reactor as the gripping means is oriented with respect to, and engages, a fuel assembly.

The foregoing object is attained by providing a gripping means for fuel assemblies of a nuclear reactor, comprising a housing accomodating a slider which is movable with respect to said housing and comes into contact with gripping jaws; the ends of said gripping jaws being pivotably mounted on the housing, whereas their opposite ends are provided with teeth to be received in an internal groove in the head of a fuel assembly as the gripping jaws open due to motion of the slider and housing with respect to each other, which gripping means is characterized, according to the invention, by the slider being provided with longitudinally extending slots to receive the gripping jaws, said longitudinally extending slots having end faces on one side, which are slanted with respect to the longitudinal axis of the gripping means and come into contact with the teeth of the gripping jaws, whereby the gripping jaws are opened.

The proposed design of the gripping means eliminates damage of the gripping jaws and axles whereupon they are mounted in the course of handling fuel assemblies of a nuclear reactor.

Other objects and advantages of the present invention will be better understood from the following detailed description of a preferred embodiment thereof to be read in conjunction with the accompanying drawings, wherein.

A gripping means 1 (FIG. 1) for fuel assemblies of a nuclear reactor is accomodated, according to the invention, in a manipulating tube 2 of the nuclear reactor's refuelling machine (not shown, nor described for reasons of brevity and clarity). The manipulating tube 2 is installed in the refuelling machine and is movable in the vertical plane. The gripping means 1 comprises a housing 3 accomodating a slider 4 which is movable with respect to the housing 3.

Figure 1:
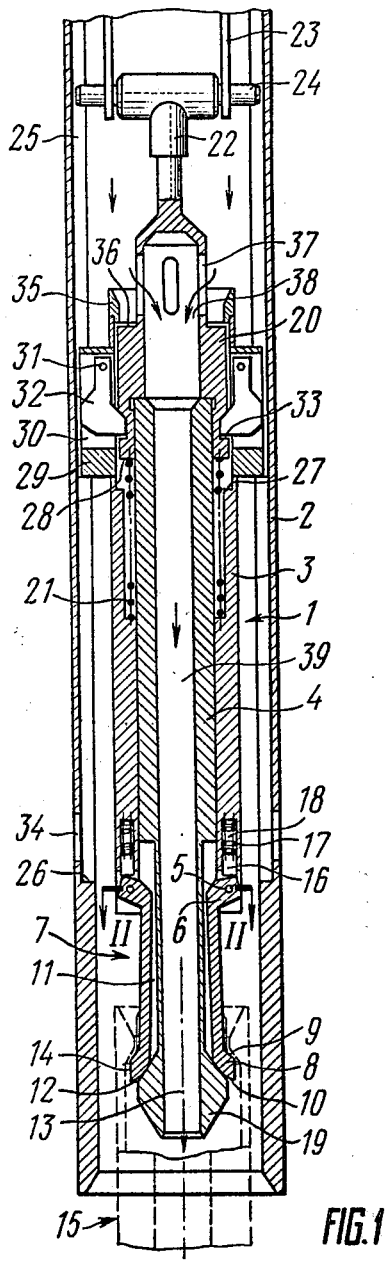
FIG. 1 is a sectional elevation view of a gripping means of a nuclear reactor, in accordance with the invention, with a schematic representation of the head of a fuel assembly.
Figure 2:
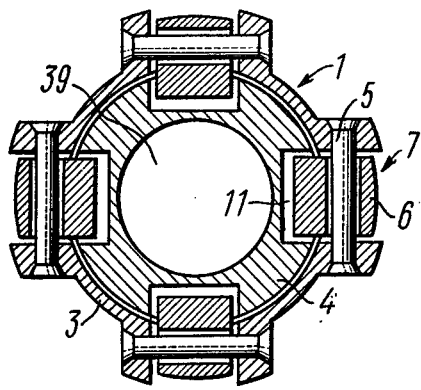
FIG. 2 is a sectional view taken on line II—II of FIG. 1.

Pivotably mounted on the housing 3 by means of axles 5 are tails 6 of four gripping jaws 7 (FIG. 2). On the ends opposite to the tails 6 (FIG. 1), the gripping jaws 7 are provided with teeth 8. Each of the teeth 8 has a working surface 9 and a contact surface 10. There must be at least two gripping jaws 7.

Figure 3:
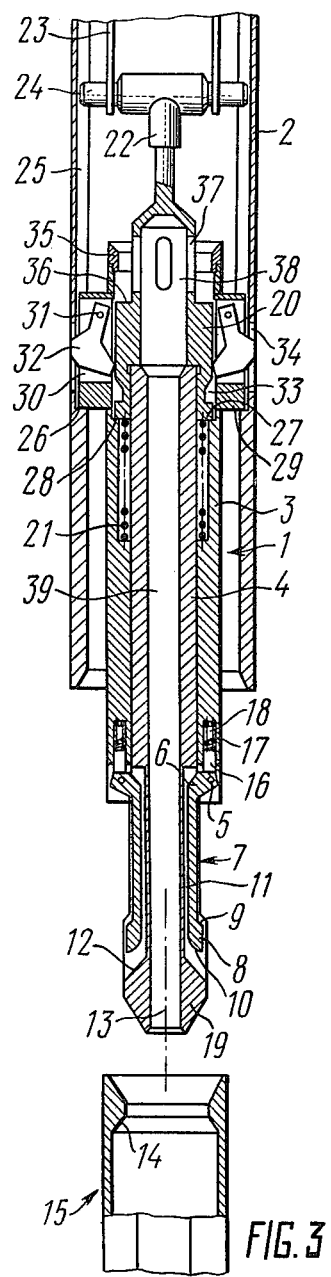
FIG. 3 is a sectional elevation view of the gripping means of FIG. 1, taken at a moment the slider of the gripping means is introduced into the head of a fuel assembly.

The slider 4 is provided with longitudinally extending slots 11 which receive the gripping jaws 7 (FIGS. 1 and 2). End faces 12 (FIG. 1) of the longitudinally extending slots 11 are slanted with respect to a longitudinal axis 13 of the gripping means 1 and come into contact with the contact surfaces 10 of the teeth 8 of the gripping jaws 7. As a result, the gripping jaws 7 open as the slider 4 and housing 3 move relative to each other so that the teeth 8 are received in an internal groove 14 (FIG. 3) provided in the head of a fuel assembly 15.

In the slots 11, the gripping jaws 7 (FIGS. 1 and 3) are permanently pressed against the body of the slider 4 by means of pushers 16 and springs 17 accomodated in holes 18 provided in the housing 3.

On one end of the slider 4, a head 19 is provided. The opposite end of the slider 4 is mounted on a support 20 which interacts with the housing 3 through a spring 21. The support 20 is connected by means of a shackle 22 to a chain 23 of the refuelling machine's drive (only a portion of one link of the chain 23 is shown). Each link of the chain 23 has axles 24 whose ends are received in longitudinal slots 25 provided on the internal surface of the manipulating tube 2. The slots 25 are rectilinear and parallel to the longitudinal axis of the manipulating tube 2. The slots 25 end at some distance from the end face of the manipulating tube 2; the end faces of the slots 25 serve as supporting surfaces 26.

On the internal surface of the housing 3 there is provided a circular jut 27 contacting with an end face 28 of the support 20.

Mounted on the housing 3 are locking means 29 received in the slots 25 of the manipulator tube 2. In slots 30 of the locking means 29 there are accomodated axles 31, whereupon there are pivotably mounted catches 32 which can be fully received in a groove 33 of the support 20 and are forced by the latter into apertures 34 (FIG. 3) as the locking means 29 abut against the supporting surfaces 26. The apertures 34 are provided in the manipulating tube 2.

Also mounted on the housing 3 is a stop 35 which comes into contact with an end face 36 of the support 20.

In the support 20 there are provided apertures 37 through which the inside of the manipulating tube 2 communicates with a cavity 38 of the support 20 and a through hole 39 of the slider 4 and with the internal cavity of the fuel assembly 15.

The operating principle of the proposed gripping means for fuel assemblies of a nuclear reactor is as follows.

In the initial state, the gripping means 1 (FIG. 1) is fully inside the manipulating tube 2, wherein it is suspended on the chain 23.

Under the action of the spring 21, the end face 36 of the support 20 is made to interact with the stop 35 of the housing 3. The end faces 12 of the longitudinal slots 11 of the slider 4 are in contact with the contact surfaces 10 of the teeth 8, whereby the gripping jaws 7 are held open. The catches 32 are in contact with the internal surface of the manipulating tube 2 and received in the groove 33 of the stop 20.

The refuelling machine's drive lowers the chain 23 with the gripping means 1 inside the manipulator tube 2. As this takes place, the gripping means 1 (FIG. 3) partially comes outside the manipulating tube. The locking means 29 abut against the supporting surfaces 26 of the longitudinal slots 25. The housing 3 stops, but the slider 4 and the support 20 continue to go down until the end face 28 of the support 20 abuts against the circular jut 27 of the housing 3. The contact surfaces 10 of the teeth 8 come out of contact with the end faces 12 of the longitudinally extending slots 11 of the slider 4. The springs 17 and pushers 16 make the gripping jaws 7 rotate about the axle 5; as a result, the gripping jaws are received in the slots 11. At the same time the catches 32 are forced by the support 20 from the groove 33 and into the apertures 34 of the manipulating tube 2.

The gripping means 1 is ready to grip the fuel assembly 15.

The refuelling machine lowers the manipulator tube 2 and the open gripping means 1. The head 19 of the slider 4 is introduced into the internal cavity of the fuel assembly 15. As this takes place, the head 19 may come into contact with the body of the fuel assembly 15, but no contact is possible between the gripping jaws 7 and the body of the fuel assembly 15 because the gripping jaws are fully inside the longitudinal slots 11 of the slider 4. Thus the probability of damaging the gripping jaws 7 is ruled out completely. The gripping jaws 7 are introduced with the head 19 of the slider 4 into the internal cavity of the fuel assembly 15.

The drive of the refuelling machine raises the chain 23 (FIG. 1) with the gripping means 1 and draws them inside the manipulating tube 2. As this takes place, the support 20 and the slider 4 go up, but the housing 3 is held in place by the spring 21 and remains stationary until the end face 36 of the support 20 comes into contact with the stop 35 of the housing 3.

As the slider 4 is lifted with respect to the stationary housing 3, the end faces 12 of the longitudinal slots 11 come into contact with the contact surfaces 10 of the gripping jaws 7. The gripping jaws turn about the axles 5 and open. The teeth 8 are received in the internal groove 14 of the head of the fuel assembly 15 (shown by the dash line), and the working surface 9 of the teeth 8 comes into contact with the fuel assembly 15. The fuel assembly 15 is thus gripped by the gripping jaws.

After the end face 36 of the support 20 comes into contact with the stop 35, the housing 3 of the gripping means 1 goes up together with the slider 4. The catches 32 are forced from the apertures 34 of the manipulating tube 2 into the groove 33 of the support 20. This eliminates accidental displacement of the support 20 and slider 4 with respect to the housing 3 and, consequently, accidental disengagement of the gripping means 1 from the fuel assembly 15 as the latter is transported by the refuelling machine.

The gripping means 1 and the fuel assembly 15 are drawn inside the manipulating tube 2.

The force with which the fuel assembly 15 is withdrawn from its socket is transmitted through the plane of contact between the working surface 9 of the tooth 8 and the body of the fuel assembly 15 in its internal groove 14 to the tooth 8, and through the plane of contact between the contact surface 10 of the tooth 8 and the end face 12 of the slider 4 to the slider 4 and on to the chain 23 and the refuelling machine's drive. Thus the force is taken only by the teeth 8 of the gripping jaws 7. The rest of the gripping jaws 7 and the axles 5, whereupon the gripping jaws 7 are mounted, are not loaded, whereby the possibility of damaging them is ruled out completely.

The refuelling machine lifts the manipulating tube 2 and brings the fuel assembly 15 to a point above the socket in which said fuel assembly 15 has to be installed. By successively moving down the manipulating tube 2 and the gripping means 1, the fuel assembly is installed in its respective socket. The gripping jaws 7 are urged by springs 17 and pushers 16 into the slots 11, while the teeth 8 (FIG. 8) of the gripping jaws 7 leave the internal groove 14 of the fuel assembly 15, and the gripping means 1 opens. The manipulating tube 2 goes up with the open gripping means 1, and the head 19 of the slider 4 leaves the internal cavity of the fuel assembly 15.

As the gripping means 1 (FIG. 1) transfers fuel assemblies 15 from the reactor core to sockets of a storage for spent fuel assemblies, a cooling medium is circulated through the fuel assemblies 15 to remove afterheat. The cooling medium is directed from the internal cavity of the manipulating tube 2, as shown by the arrows in the drawing, through the apertures 37, the cavity 38 of the support 20 and the hole 39 of the slider 4 to the internal cavity of the spent fuel assembly 15.

The rest of the nuclear reactor's fuel assemblies are handled as described above.

The proposed gripping means for fuel assemblies of a nuclear reactor ensures reliable gripping of fuel assemblies and eliminates damage of the gripping jaws while handling fuel assemblies.

What is claimed is:

1. Apparatus for gripping fuel assemblies of a nuclear reactor, which fuel assemblies include heads and internal grooves provided in said heads, said apparatus having a longitudinal axis and comprising:

a cylindrical tube;

a gripping means having a longitudinal axis, accommodated in said tube, and longitudinally movable therein, said gripping means comprising, a housing;

a slider accommodated in said housing and movable relative to said housing;

longitudinal slots provided in the body of said slider and having first end faces, the first end faces of said longitudinal slots being slanted with respect to said longitudinal axis;

gripping jaws having tails on one end and teeth on the other end of each of said gripping jaws;

said tails being pivotably mounted on said housing; and moving means for moving said gripping means relative to said tube between a first position wherein said gripping means is accommodated within said tube, and a second position wherein a portion of said gripping means, including said gripping jaws, are positioned outside of said tube, along the longitudinal axis of said tube;

means for moving said slider relative to said housing when said gripping means is at said second position, thereby pivoting said gripping jaws between a position wherein said teeth of said gripping jaws are accommodated within said longitudinal slots of said slider, and a position wherein said gripping jaws open so that said teeth are receivable in said internal groove of said fuel assembly head.

* * * * *